US011995851B2

(12) United States Patent
Du Preez

(10) Patent No.: US 11,995,851 B2
(45) Date of Patent: May 28, 2024

(54) OPTICAL SURFACE ENCODER

(71) Applicant: Isak Du Preez, Kranshop (ZA)

(72) Inventor: Isak Du Preez, Kranshop (ZA)

( * ) Notice: Subject to any disclaimer, the term of this patent is extended or adjusted under 35 U.S.C. 154(b) by 126 days.

(21) Appl. No.: 17/281,160

(22) PCT Filed: Oct. 4, 2019

(86) PCT No.: PCT/ZA2019/050064
§ 371 (c)(1),
(2) Date: Mar. 29, 2021

(87) PCT Pub. No.: WO2020/073065
PCT Pub. Date: Apr. 9, 2020

(65) Prior Publication Data
US 2022/0051423 A1    Feb. 17, 2022

(30) Foreign Application Priority Data

Oct. 4, 2018  (ZA) .................................. 2018/06583

(51) Int. Cl.
*G06T 7/514* (2017.01)
*G01B 11/25* (2006.01)
*G06T 7/00* (2017.01)

(52) U.S. Cl.
CPC .......... *G06T 7/514* (2017.01); *G01B 11/2513* (2013.01); *G01B 11/2522* (2013.01); *G06T 7/0004* (2013.01); *G06T 2207/10004* (2013.01); *G06T 2207/30252* (2013.01)

(58) Field of Classification Search
CPC ................... G06T 7/514; G06T 7/0004; G06T 2207/10004; G06T 2207/30252; G01B 11/2513; G01B 11/2522
See application file for complete search history.

(56) References Cited

U.S. PATENT DOCUMENTS 6,438,272 B1   8/2002   Huang et al.
7,649,628 B2   1/2010   Wadman
(Continued)

FOREIGN PATENT DOCUMENTS

DE   19944354      4/2001
DE   102010015566  10/2011
DE   102010029627  12/2011
(Continued)

OTHER PUBLICATIONS

International Search Report and Written Opinion dated Feb. 14, 2020 in International Patent Application No. PCT/ZA2019/050064.
(Continued)

*Primary Examiner* — Zhitong Chen
(74) *Attorney, Agent, or Firm* — Billion & Armitage

(57) ABSTRACT

An apparatus to generate data relating to a specular surface of an object, the apparatus including a screen that is movable relative to the object, a graphic rendered on the screen' wherein the graphic is notionally divided into contiguous segments such that the graphic content in each segment allows that segment to be distinguished from a plurality of other segments, at least one camera for capturing successive frames of the object' illuminated by said graphic, during said relative movement of the screen, and a computing device that accepts data from pixels of the captured frames.

20 Claims, 10 Drawing Sheets

(56) References Cited

U.S. PATENT DOCUMENTS

2008/0030744 A1* 2/2008 Beardsley .......... G01B 11/2527
356/601
2011/0285987 A1 11/2011 Surrel

FOREIGN PATENT DOCUMENTS

| DE | 102014106238 | 11/2015 | | |
|----|----|----|----|----|
| DE | 102015008409 | 1/2017 | | |
| EP | 1884740 | 2/2008 | | |
| GB | 2308656 | 7/1997 | | |
| JP | H1096615 | 4/1998 | | |
| WO | 2013102572 | 7/2013 | | |
| WO | 2018130421 | 7/2018 | | |
| WO | WO-2018158435 A1 * | 9/2018 | ............... | A61B 3/10 |

OTHER PUBLICATIONS

Horbach J. W. et al. "Deflectometric inspection of diffuse surfaces in the far-infrared spectrum", Proceedings of Spie/Is & T, Web Page <https://www.spiedigitallibrary.org/conference-proceedings-of-spie/5679/1/Deflectometric-inspection-of-diffuse-surfaces-in-the-far-infrared-spectrum/10.1117/12.586612.short?tab=ArticleLink>, Feb. 24, 2005, 3 pages, vol. 5679.

International Preliminary Report on Patentability dated Sep. 23, 2020 in International Patent Application No. PCT/ZA2019/050064.

* cited by examiner

OPTICAL SURFACE ENCODER

BACKGROUND OF THE INVENTION

The present invention relates to an apparatus that facilitates acquisition of a light map sensitive to the shape of a specular surface of an object, viewed by a camera, and surrounded by an artificial scene designed to facilitate the process of producing the light map.

As is known in the field of deflectometry, a light map is useful in digital recovery of the three-dimensional shape of an object's specular surfaces [Balzer et. al 2014]. A light map has also been referred to as a Simple Geometric Mapping Function in [Rapp et. Al. 2012].

An existing approach to producing a light map is diagrammatically illustrated in FIG. 1, wherein a succession of images displayed by a suitable display 10 illuminate a specular object 12. The object 12 is viewed by a camera 16. The camera 16, the object 12, and the display 10 are stationary and held in a fixed relationship to one another, such that any particular point on the surface of the display 10 embodies a scene point. The displayed images are each predetermined and differ from one another. The camera 16 acquires successive frames relating to the respective displayed images. Data relating to the acquired frames is then submitted to a computing device 18 for processing.

For the computing device 18 to produce a light map, it may consider the data relating to each camera pixel, which data (called the observed signal) describes what that camera pixel observed over the frame sequence, and therefrom attempt to determine to which scene point that camera pixel is responsive.

To facilitate the aforementioned process, a technique called temporal encoding may be employed. To employ temporal encoding, the displayed images are designed such that each point on the display is identifiable (to some required degree of accuracy) from the light signal emanating from that point on the display over the succession of displayed images which are separated in time. This means that any two points on the display that are (for practical purposes) physically separate from one another emanate light signals (over the succession of displayed images) that are (for the same practical purposes) distinguishable from one another.

The computing device 18 attempts to apply temporal decoding, which is to attempt to recognize the scene point corresponding to a camera pixel's observed signal. By repeating this for each camera pixel, the computing device can construct the light map. For some camera pixels this process may fail (and indeed should fail when the camera pixel is not responsive to any scene point on the display's active surface) in which case that camera pixel remains unmapped.

One technique in the field of deflectometry that employs temporal encoding has been referred to as "phase-measuring deflectometry with multi-frequency temporal phase unwrapping" by [Huang et al 2018].

Some other techniques in the field of deflectometry employ partial temporal encoding (meaning that ambiguity remains after temporal decoding) in conjunction with assumptions about spatial constraints and local smoothness of the object's surface (to resolve said ambiguity) to arrive at the same result. One such technique has been referred to as "phase measuring deflectometry with marker-assisted spatial phase unwrapping" [Huang et al 2018].

The arrangement shown in FIG. 1 works reasonably well when the surface of the object 12 is substantially flat. However if the surface has a significant degree of curvature anywhere, then a large display 10 may be called for in order to cover the object's specular surface, from the perspective of the camera 16, in a reflected image of the display, and thereby maximize the coverage of the specular object's surface with mapped pixels. Employing a large display is liable to increase the cost of producing such a system.

For some objects even an infinitely large flat display would provide insufficient coverage (of camera pixels mapped to display points in the light map) as a flat display cannot subtend more than 180° at the object, and an arcuate or cylindrical display may be called for. Substantially arcuate or cylindrical displays are not as readily available as flat displays, and liable to significantly impact the cost of producing such a system.

While an arcuate or cylindrical display can potentially subtend an angle greater than 180° (at the object) along its curved dimension, it cannot accomplish this along the transverse (uncurved) dimension. A display that is curved along two perpendicular dimensions would be even less readily available and more difficult to manufacture from readily available rectangular display modules.

One approach to addressing the aforementioned problems is to use multiple displays, arranged around the object under inspection [Balzer et al. 2014]. However, this approach introduces seams/artefacts into the acquired light map at the edges and corners where the flat displays/screens meet one another. Moreover the approach remains mechanically cumbersome, requiring either multiple large displays held in a specific relationship to one another, or careful positioning and calibration in the case of projectors and screens.

Another problem encountered in the aforementioned approaches is that the cameras observing the object under inspection may themselves occlude parts of the scene from parts of that object. In any given camera's perspective, the parts of the object's specular surface covered in reflected images of the cameras (including the viewing camera itself) will remain unmapped in the light map eventually produced (and therefore that part of the object's specular surface cannot be digitally recovered or analyzed by means of that light map).

Another limitation of all the aforementioned approaches is that displays and projectors emitting light of invisible wavelengths are not as readily available as those emitting visible light, [Hofer et al 2016, Huang et. al. 2018], since commercially available displays and projectors are normally intended for human viewing. For example, surfaces such as those of unpainted steel may be insufficiently specular at visible wavelengths of light yet sufficiently specular at longer wavelengths such as infra-red. Infra-red cameras are readily available, and it may be desirable to use an infrared-emitting scene surface to produce a light map for such surfaces.

To use infrared light for scene point encoding, one approach is to apply or print a static sinusoidal pattern (varying along one dimension) on a thermally emitting metallic sheet (potentially heated), and then to physically shift and rotate the sheet [Höfer et al 2016], so as to emulate the display in phase measuring deflectometry. Accomplishing this movement, involving two degrees of freedom may be complex and costly, and the encoded scene surface is presumably confined to a plane.

An object of the present invention is to address to a significant extent the aforementioned problems and limitations by encoding scene points with an apparatus that involves an illuminant physically movable with one degree of freedom.

SUMMARY OF THE INVENTION

In the following description use is made of a number of technical terms which have specific meanings. To eliminate ambiguity as to the meanings of these terms the definitions in Annex A should be applied.

The definitions in some instances may extend to inventive features and, in that respect, are to be interpreted and applied as potentially embodying aspects of the disclosure of the inventive concept and its manner of application.

According to the present invention there is provided an apparatus to facilitate generation of a light map sensitive to a specular surface of an object under inspection, which apparatus includes:
 (a) a screen that is movable with sliding motion relative to the object,
 (b) a predetermined latitude-encoding graphic rendered on the screen in accordance with its intrinsic latitude and longitude coordinate system, determined by the screen's sliding motion parameterized by a slide parameter,
 (c) at least one camera for capturing successive frames of the object during said relative sliding motion of the screen, and
 (d) a computing device that accepts data of the captured frames for storage or processing.

The screen, may be shaped as a self-sliding surface.

The screen may be movable relative to the object with primarily one degree of freedom. The camera may be held in a fixed spatial relationship to the object.

The rendering of the graphic on the screen may be such that the rendered graphic illuminates the object from all positions traversed by the sliding screen.

The sliding motion may be controlled or time-predictable or otherwise measured, or alternatively a control mechanism may be used, to associate each captured frame with the slide parameter at the time that the frame was captured.

The slide parameter may be referred to as the "scan state" as it identifies the position of the screen within its set of positions traversable by sliding motion.

The camera and the object are stationary or held in fixed relation to one another. During a procedure hereinafter referred to as "a scan procedure", the screen undergoes sliding motion from an initial position corresponding to scan state $s_0$ to a final position corresponding to scan state $s_1$, while the camera captures frames of the object as illuminated by the latitude-encoding graphic carried by the moving screen.

The screen may be embodied in any suitable way and the graphic may be rendered on the screen in any suitable way. These are not here considered significant problems to solve.

The apparatus may include a synchronising mechanism for associating each frame captured by the camera with a scan state (i.e. screen position) corresponding to the frame's time of capture.

If the motion of the screen is controlled in such a way that the scan state is a predictable function of time, then the synchronizing mechanism may simply associate each camera frame with the time-predicted scan state corresponding to the camera frame's time of capture. In an alternative embodiment, the synchronizing mechanism may employ a distance sensor or position encoder, the measurements of which may be used to estimate the scan state at the time of each captured camera frame.

The data relating to the captured camera frames are input to the computing device, together with the scan state associated with each camera frame (or sufficient information to determine it).

If the frames were captured during sliding motion with sufficient frequency (with respect to scan state) then the computing device is in a position, for each camera pixel, to reconstruct an approximation of the signal describing light incident on said pixel as a function of scan state.

That region of the screen's (stationary and notional) reference surface that is traversed both by the screen's leading edge and by the screen's trailing edge during the scan procedure is referred to hereinafter as the "encoded scene surface".

Due to the way in which the latitude-encoding graphic is embedded on the screen in relation to its sliding motion, any given scene point (fixed in the encoded scene surface) is visited by all points of the corresponding latitude on the screen (and therefore by an entire latitude codeword of the graphic) during the course of the scan procedure. The light emanating from any point in the encoded scene surface, as a function of the slide parameter (i.e. scan state) can be described by the scene point's latitude codeword shifted by the scene point's longitude.

More formally: If the screen is described parametrically by $((u,v) \in R) \mapsto (P(u+s,v) \in \mathbb{R}^3)$ where u is longitude on the screen, v is latitude on the screen s is the scan state and $P(u+s,v) \in \mathbb{R}^3$ is the physical location of the point with screen longitude u and screen latitude v, and if the latitude-encoding graphic is $(u,v) \mapsto G(u,v)$, then the light emanating from any moving point $P(u+s,v)$ in the encoded scene surface is described by $G(u,v)$ and therefore the light emanating from any stationary point $P(U,V)$ in the encoded scene surface is described by $G(U-s,V) = G_V(s-U)$.

To facilitate prospective identification of the latitudes of unknown but fixed scene points from optical signals describing light observed to be emanating from those scene points (as a function of scan state), the latitude-encoding graphic may be selected (by design) such that each respective latitude corresponds to a unique readable codeword, or such that readable codewords at consequentially different latitudes (for the practical purposes of the invention) are recognizably different from one another (for the same practical purposes).

Moreover, since the optical signal emanating from any given scene point is in general approximated by a latitude codeword shifted by that scene point's longitude, the latitude-encoding graphic may be selected (by design) such that readable codewords at consequentially different latitudes are separated by a sufficient shift-invariant distance to robustly discriminate between them in the presence of noise or distortion.

Each camera pixel that is responsive to a (typically small) neighbourhood of scene points in the encoded scene surface, observes light (varying over scan state) that is an aggregation of the light emanating from the scene points in that neighbourhood, combined with other light such as diffuse reflection on the object's surface.

Diffusely reflected light observed by any given camera pixel at some point on the object's surface originates from a diffuse variety of scene points, and therefore changes gradually, if at all, during the motion of the screen, and can in principle be suppressed by a high-pass filter known in the art of signal processing.

The latitude-encoding graphic may be selected (by design) such that its latitude codewords comprise relatively high-frequency components, so as to facilitate discrimination of specular reflection (observed by a camera pixel and originating from a particular scene point's neighbourhood) from diffuse reflection consisting predominantly of low-frequency components in the combined optical signal (describing observed light as a function of scan state).

Due to spatial variation in curvature of the specular surface of the object under inspection, as well as due to other factors that vary spatially, some camera pixels are (individually) responsive to substantially larger regions of the encoded scene surface than approximated by the reading resolution.

The latitude-encoding graphic may be selected (by design) such that the pointwise average of neighbouring readable codewords is similar to the readable codeword corresponding to the average of those neighbouring readable codewords' latitude. More particularly, the latitudinal code nonlinearity of the latitude-encoding graphic may be bounded above by a predetermined maximum value suitable for the expected degree of maximum curvature in the specular surface of the object under inspection.

The camera may be situated inside the encoded scene surface (meaning on the same side of the encoded scene surface as the object under inspection) or outside (meaning on the other side of) the encoded scene surface, in which case it cannot occlude parts of the encoded screen surface from the object, although the object may be occluded from the camera by the moving screen at some point during its motion.

To facilitate use of a screen that is substantially narrower than it is long, the latitude-encoding graphic may be selected (by design) to have a latitudinal code packing coefficient that is substantially greater than 1.0 (which corresponds to the latitude-encoding graphic used in FIGS. 3A to 3C FIGS.

The optical signal (varying over scan state) observed by any given camera pixel (during the scan procedure) may have a component arising from diffuse reflection, which component may be suppressed by a signal-conditioning process such as high-pass filtering.

In the optical signal observed by any given camera pixel responsive to some encoded scene point may be decoded by means of a lookup table populated by $(G_v, v)$ entries separated by a sufficiently short latitude interval. The latitude decoding may in principle then proceed by selecting the latitude v in the entry whose codeword $G_v$ is most similar (in some appropriate sense such as having the lowest shift-invariant distance) to the original latitude codeword (or shifted version of it that had been observed). If the observed signal is conditioned (such as by high-pass filtering) then the $G_v$ entries populating the lookup table may be similarly pre-conditioned by the same process.

In principle the longitude of the scene point from which an observed optical signal emanated can be determined from the (potentially conditioned) observed signal and its decoded latitude's (potentially pre-conditioned) codeword as being equal to the relative shift that minimizes the optical distance between them, or between similarly conditioned versions of them.

To facilitate prospective identification of longitudes of scene points from which observed signals emanated, the latitude-encoding graphic may be selected (by design) such that readable codewords each have sufficiently concentrated auto-correlation functions, which may be attained if the codewords have sufficient spatial bandwidth (along longitude), such as for example by including at least one high contrast feature, such as a black-white (or other contrasting colours or symbols) (longitudinally) edge extending across latitudes.

If the latitude-encoding graphic is such that the latitude and longitude of a scene point can be identified from the light emanated by that scene point (or the signal describing said light over scan state) then the scene points within the encoded scene surface have been temporally encoded, and the frames captured by the camera during the scan procedure (together with their associated scan states) constitute an encoded light map.

For purposes of inspecting objects with surfaces that are more specular to infrared light than to visible light, the screen may be embodied, for example, by a metallic sheet shaped appropriately and potentially heated, with the graphic applied to it by means of a thermally-emissive substance e.g. black paint. This is also known as an emissivity-coded screen in [Höfer et. al 2016].

The metallic sheet may be cut away in regions, or may be otherwise treated to contrast with a background.

Additional cameras may be employed in different positions (all stationary relative to the object) to generate additional light maps (for example to measure different regions of the object's specular surface, or for purposes of enriching the acquired data). These cameras can be considered to instantiate multiple instances of the present invention sharing all components except the cameras.

To extend the encoded scene surface to a greater range of latitudes at the cost of introducing ambiguity in the prospective latitude decoding process, multiple latitude-encoding graphics (which may employ some or all of the same latitude codewords) may be rendered on the screen to occupy different (preferably disjoint) intervals of latitude. An introduced ambiguity may be resolved by means outside of temporal encoding/decoding, which may involve techniques of spatial phase-unwrapping known in the art. FIG. 5 depicts an example of a latitude-encoding graphic repeated cyclically at consecutive latitude ranges, with particular latitude codewords modified (by introducing dots) with a view to later serving as absolute phase markers in marker-assisted spatial phase unwrapping in the eventual decoded light map.

The latitude-encoding graphic may be carried on any suitably shaped slidable surface. Such surface may be arcuate and be curved sufficiently to ensure that the at least one camera can detect reflections from all points on the object. It may therefore be necessary to make use of a plurality of cameras with each camera being in a fixed position relative to the object.

The graphic may be elongate with a length which is greater, possibly by orders of magnitude, than its width. The movement of the graphic may be transverse to its length i.e. in the direction of its width.

It is preferable to move the graphic with respect to the object and the cameras (which are kept stationary), but this is not essential, for conceivably the graphic could be kept stationary and the object and the cameras, which are maintained in a fixed spatial relationship to one another during the scan procedure, could be moved with respect to the graphic.

The distance by which the screen (and hence the graphic) is movable may be at least five times greater than its width (or median width if applicable). The physical constraints and comparative factors mentioned herein assist in the implementation of a cost-effective apparatus with a satisfactory resolution.

Thus in contrast to the prior art approach described hereinbefore with reference to FIG. 1 the present invention in one embodiment makes use of a single graphic which is designed for the purpose and which is caused to move relative to a stationary object which is viewed by means of one or more cameras which are fixed relative to the object i.e. the object is kept stationary in the field of view of the camera which then captures a succession of frames of the object.

In one embodiment any slice on the graphic has a longitudinal coordinate that varies on a line which is parallel to the direction of movement. The value of the longitudinal coordinate may be ascertained by noting the extent of movement of the slice e.g. the longitudinal coordinate of a point, from which light (captured by a pixel) emanated, may be directly related to the degree of movement of the slice from a reference location which embodies that point. Such movement is in turn is synchronised with the capturing of the successive frames by the camera in that each time a frame is captured the position of the graphic is known and hence the longitudinal coordinate of that slice is known.

A latitudinal coordinate of that slice is ascertainable from the data captured by the relevant pixel, for the succession of frames, for this is determined by the design of the graphic.

The detail of the graphic in each slice may be unique so that the slice is distinguishable from any other slice in the graphic. Alternatively the detail of the graphic in each slice in a defined set of consecutive slices may be unique in that set of slices.

The size and shape of the reference surface are determined by the shape and size of the screen, and by the direction and extent of movement thereof.

The reference surface, also referred to as a slidable surface, can take on a variety of shapes as depicted, by way of example only, in FIGS. 2A to 2D FIGS.

FIGS. 2A, 2B, and 2C depict surfaces of revolution, which can undergo rotational sliding motion about a vertical axis. In these figures, the circular gridlines are lines of latitude, while the gridlines perpendicular to them are lines of longitude.

The cylindrical surface in FIG. 2B FIG. can also undergo translational sliding motion along the cylinder's axis. In this case the circular gridlines would be lines of longitude, while the straight gridlines would be lines of latitude.

FIG. 2D depicts a slidable surface that is a helicoid, which can undergo sliding motion that is a combination of translation (along the helicoid's axis) and rotation (about the helicoid's axis) in a predetermined ratio. The spiral gridlines are lines of latitude, while the complementary gridlines are lines of longitude.

The slices of the graphic, also referred to herein as segments of the graphic, are preferably contiguous—i.e. adjacent one another over the extent of the graphic.

The invention also provides a method of generating data relating to a specular surface of an object, the method including the steps of:
(a) providing a graphic of predetermined characteristics,
(b) positioning at least one camera at a fixed position relative to the object whereby the camera can view the object,
(c) causing the graphic to move relative to the object along a notional reference surface that is stationary relative to the object,
(d) causing the camera to capture a plurality of frames of the object, each frame including a plurality of pixels, wherein each frame is associated with a respective position of the graphic in the reference surface, and
(e) relating each pixel which recorded light to a scene point in the reference surface from which that light emanated.

The frames may be captured at a rate which is dependent on the speed of movement of the graphic. As the data in each pixel is dependent on the position of the graphic relative to the object, a longitudinal coordinate of the scene point in the graphic from which the light in the pixel originated can be determined.

In one embodiment, the graphic in an elongate direction may at least notionally be divided into a plurality of contiguous elements or segments referred to as slices (as per the definition thereof). Within each slice the characteristics of the graphic are related to the position of the slice, in the graphic, and hence related to the latitudinal coordinate of the graphic in the reference surface from which the light in the respective pixel originated.

The graphic may be a latitude-encoding graphic.

It is apparent e.g. from FIGS. 2A to 2D and from FIGS. 10A to 10D and from the definition of a self-sliding surface that a variety of different shapes are possible for a screen shaped as a slidable surface. In one example of the invention the screen is partly arcuate or cylindrical in one direction. The shape of the surface is defined in one direction by the direction of movement of the graphic, and, in a transverse direction, is defined by a surface on which the graphic lies.

The invention also extends to an apparatus to generate data relating to a specular surface of an object, the apparatus including:
(a) a screen that is movable relative to the object;
(b) a graphic rendered on the screen, wherein the graphic is notionally divided into contiguous segments such that the graphic content in each segment allows that segment to be distinguished from a plurality of other segments;
(c) at least one camera for capturing successive frames of the object, illuminated by said graphic, during said relative movement of the screen; and
(d) a computing device that accepts data from pixels of the captured frames.

The graphic may be elongate with a length which is greater at least by an order of magnitude than its width.

Features of the invention, listed hereinbefore, may be combined with one another, according to requirement.

The invention also provides an apparatus to facilitate generation of data relating to the shape of a partially or totally specular surface of a stationary object, the apparatus including:
(a) a screen having a leading edge and a trailing edge which are spaced from one another across a width dimension of the screen, wherein the screen is movable relative to the object such that the trailing edge follows the leading edge on a notional surface between respective start and end positions;
(b) at least one stationary camera capable of capturing a succession of frames of the object; and
(c) a static graphic of predetermined characteristics carried by the screen.

The camera may be positioned on an opposing side of the notional surface from the object, such that the screen occludes the object from the camera at some point during its motion.

The screen may be longer by an order of magnitude or more than it is wide. The screen may be substantially arcuate along its length.

The screen may be movable by rotating about an axis. The axis may be notional or physical.

The static graphic may be notionally divisible by notional dividing lines into at least twenty notional slices of approximately equal thickness wherein:
(a) each notional dividing line extends through the screen's leading edge and the screen's trailing edge;
(b) the notional dividing lines are oriented such that the notional slices, when carried by the movable screen, move longitudinally; and
(c) the graphic content contained in any notional slice is distinguishable from the graphic content contained in an adjacent notional slice.

The longitudinal movement of the notional dividing lines is thus such that the movement is parallel to the direction in which the notional dividing lines extend.

Preferably each notional slice has a thickness approximately equal to a predetermined speed at which the movable screen is capable of moving divided by a predetermined rate at which the camera is capable of capturing frames.

Preferably the notional slices are each unique or are distinguishable from one another and are non-repeating for at least twenty consecutive notional slices.

Preferably there are substantially more than twenty slices.

As the number of slices (for a graphic) is increased, the size of each slice is reduced and the resolution of the apparatus is increased.

The screen may be substantially arcuate along a dimension that is substantially perpendicular to its width.

The screen may be curved along two perpendicular dimensions.

BRIEF DESCRIPTION OF THE DRAWINGS

The invention is further described by way of examples with reference to the accompanying drawings wherein.

DESCRIPTION OF PREFERRED EMBODIMENTS

Figure 3A:
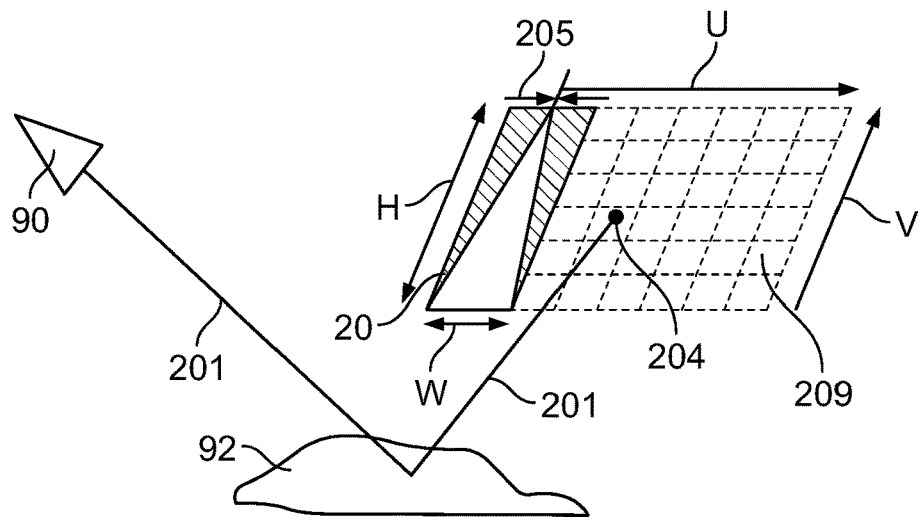
FIGS. 3A, 3B, 3C, and 3D illustrate latitude-encodinq qraphics in connection with respective reference surfaces.
Figure 3B:
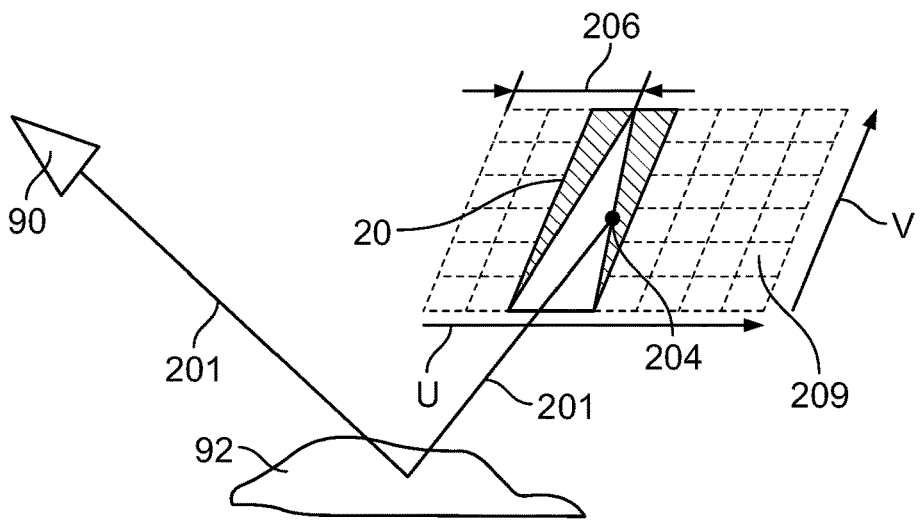
Figure 3C:
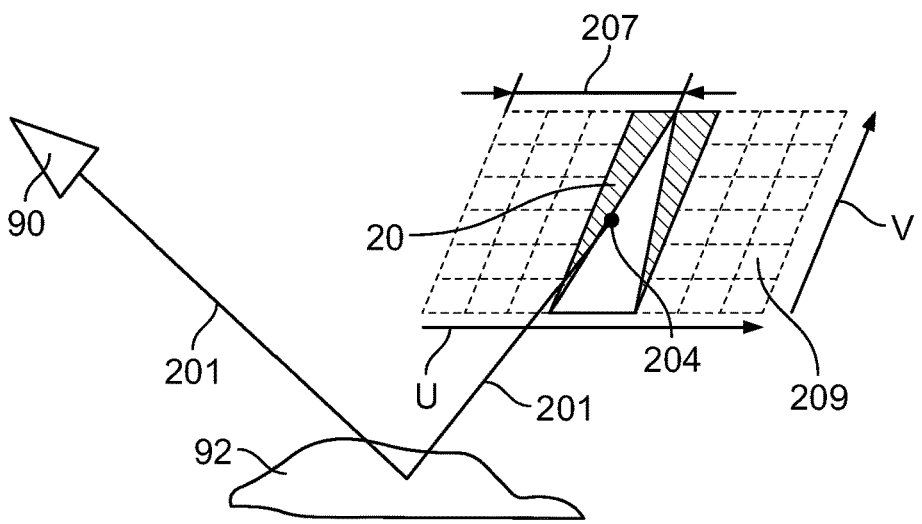
Figure 3D:
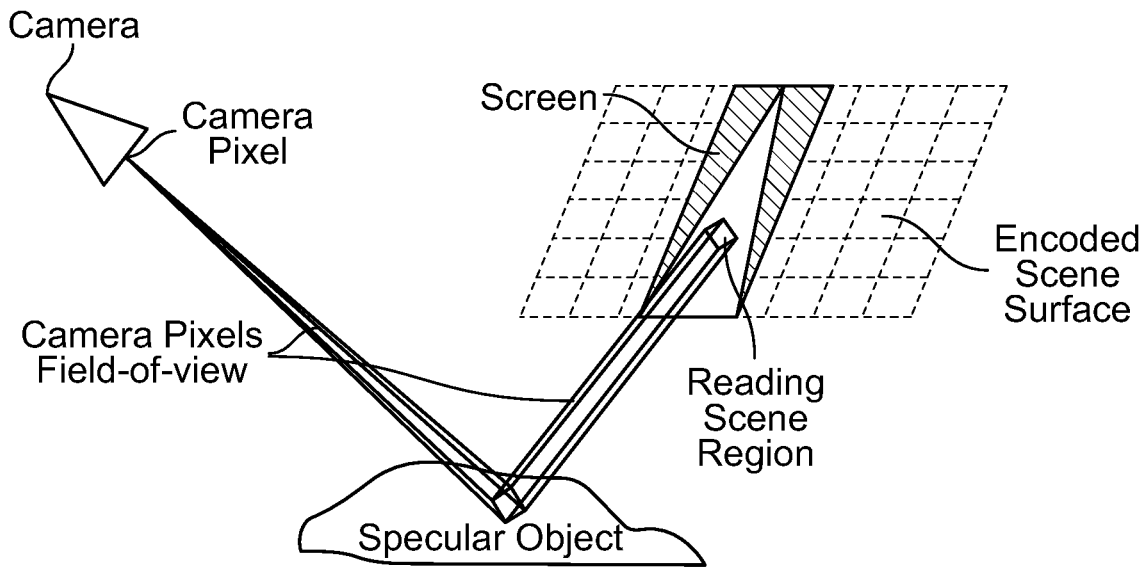

Conceptual aspects of the invention are described by way of a simplified example with reference to FIGS. 3A, 3B, and 3C.

A latitude-encoding graphic 20, which in this instance comprises a white triangle on a black background, is carried on a screen (not shown) at a constant speed in a direction U i.e. from the left to the right. The graphic has a height H and a width W. The graphic's initial displacement 205 is zero. A fixed point 204 is located in the path of the moving latitude-encoding graphic, in a stationary reference surface 209, each point of which can be identified by latitude V and longitude U coordinates.

If regard is had to the intensity of light emanating from a given stationary point 204 which lies in the path of the moving latitude-encoding graphic then, in general, the point turns from black to white and then from white to black as the triangle in the graphic traverses it. The period of time for which the point remains white (between these transitions) depends on the latitude of the point. The greater is the latitude the shorter is the duration of the period of time for which the point remains white. The greater is the longitude, the later are the times at which the point changes colour. If the screen's displacement 206 (FIG. 3B) when the point turns from black to white is $s_1$, and if the screen's displacement 207 (FIG. 3C) when the point turns from white to black is $S_2$ then the point's location can be deduced from the following equations:

$$\text{latitude} = H - \frac{H}{W}(s_2 - s_1)$$

$$\text{longitude} = \frac{s_1 + s_2}{2}$$

Any given point on the encoded scene surface emanates (as a light signal over the screen's displacement) a rectangular pulse whose width encodes the point's latitude, and whose delay (or shift) encodes the point's longitude, and in this way temporal encoding of all the scene points traversed by the graphic is achieved.

A pixel of a camera 90 responsive to a particular scene point 204 in the encoded scene surface (via an optical path 201 which may involve specular reflection on the object 92) observes a light signal that encodes the scene point's latitude V and longitude U, and may be decoded in principle by means of the aforementioned equations.

Figure 8:
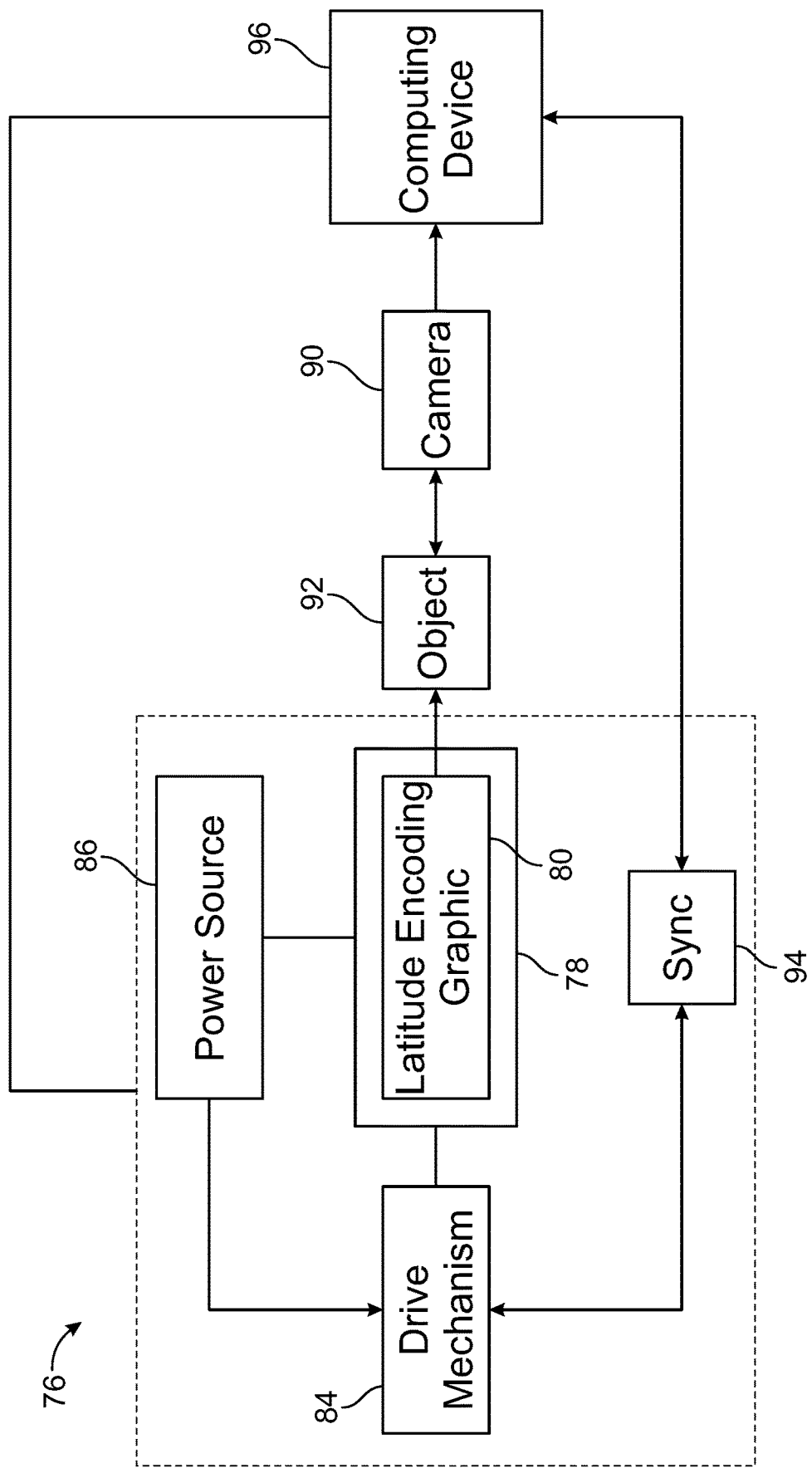
FIG. 8 illustrates in block diagram form some aspects of the invention.

FIG. 8 Illustrates in block diagram form some components of some embodiments of the present invention, which components include a stationary object 92 under inspection (which may have a specular surface), a stationary camera 90 observing the object, and a scene point encoder 76.

The scene point encoder 76 in FIG. 8 comprises a screen 78 which is shaped as a slidable surface, a latitude-encoding graphic 80 carried by the screen and illuminating the object, a mechanism 84 by means of which the screen can be caused to move with sliding motion, a power source 86 providing energy potentially required by other components of the scene point encoder, and a synchronizing means 94 by which the position of the screen 78 at the time of each frame capture (by the camera 90) can be ascertained or estimated. During the sliding motion, the latitude-encoding graphic 80 is carried by the screen 78 during what is referred to as the scan procedure, while the camera 90 captures a succession of frames which are each associated with a particular position of the screen 78.

Some variations of the present invention have already been accommodated within the definitions of terms used to describe the invention. Some of those and further variations of some parts of the present invention are described briefly below by way of example only.

The means of associating each frame captured by the camera (or cameras) with a scan state corresponding to the frame's time of capture, can take many different forms, and is not here considered as a significant problem to solve. In the case of the screen undergoing controlled motion with a time-predictable position, known speed, it may simply be a matter of deducing the scan state (implying screen position) corresponding to each frame from the frame's timestamp. Alternatively, the position of the screen can be tracked by means of a distance sensor and a state estimation algorithm such as Kalman filtering. A third example possibility is to signal motion-increments optically into the successive frames, and deduce the screen position for each frame by extracting this information.

Figure 9A:
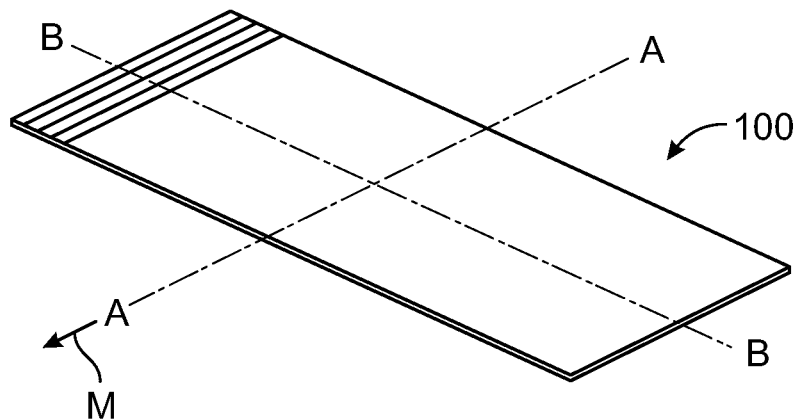
FIGS. 9A, 9B, 9C, and 9D illustrate some exemplary embodiments of the screen with a few slices illustrated on each.

In some embodiments the screen may be planar (as depicted for example in FIG. 9A in shape and undergo linear or rotational motion during the scan procedure.

Figure 9B:
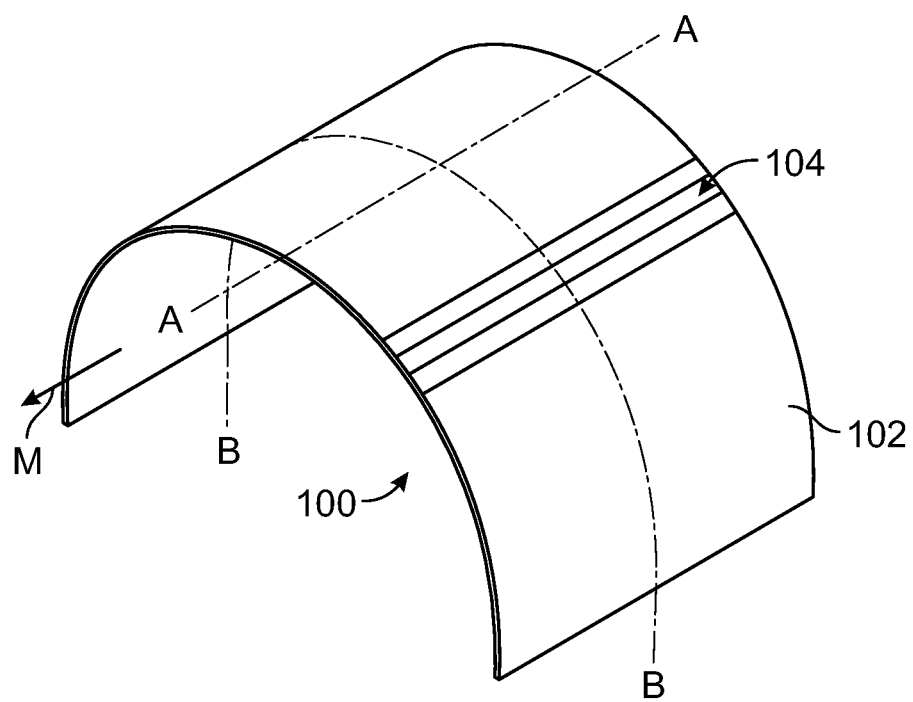
Figure 9C:
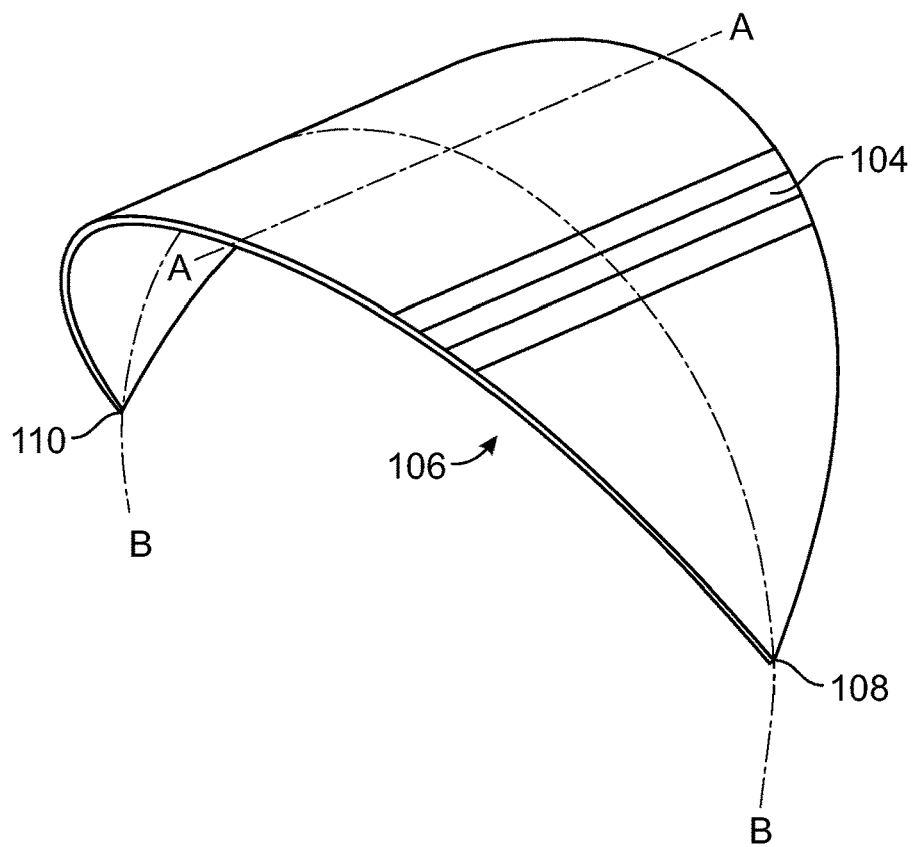

In alternative embodiments the screen may be an arcuate (cylindrical) surface as depicted for examples in FIG. 9B and FIG. 9C undergoing linear motion along an axis A-A in FIG. 9B and FIG. 9C during the scan procedure.

Figure 9D:
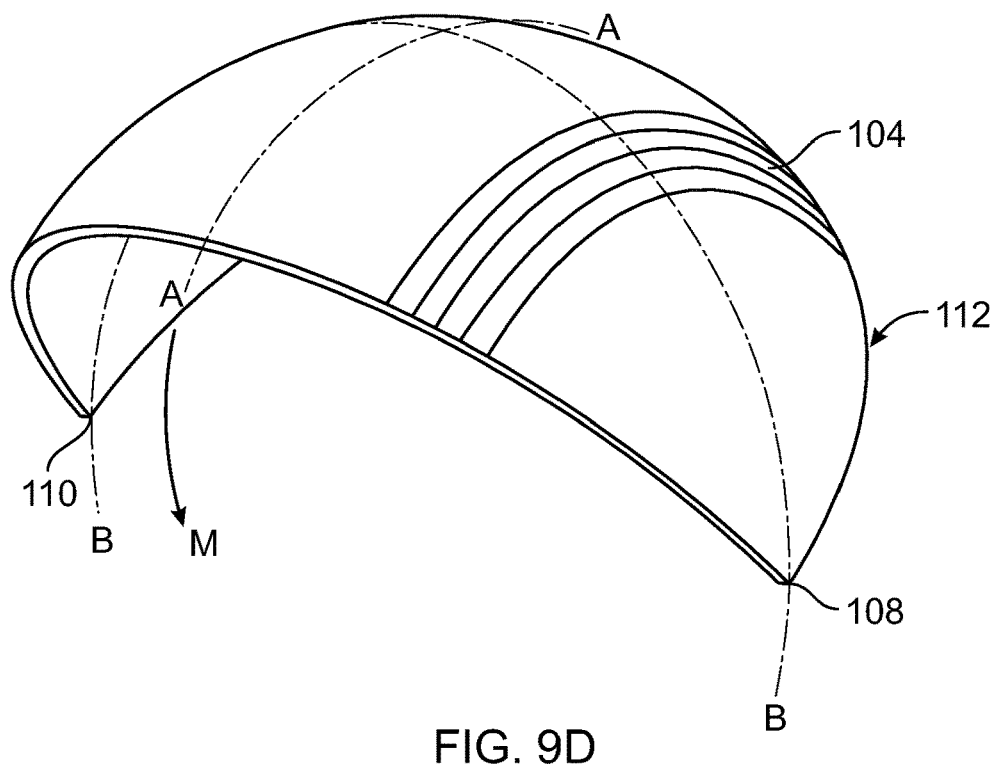

In alternative embodiments the screen may be spherical in shape as depicted for example in FIG. 9D and undergo rotational motion along a curved axis A-A in FIG. 9D such as by pivoting about some axis (perpendicular to A-A at all points and equidistant from those points). For example in the case of a spherical screen (or any screen with curvature in two directions) the graphic is distorted during rendering to conform with the intrinsic latitude and longitude coordinate system of the screen.

Further embodiments with different screen shapes are accommodated within the definition of the term self-sliding surface to which the screen may conform if it is a slidable surface.

Figure 4:
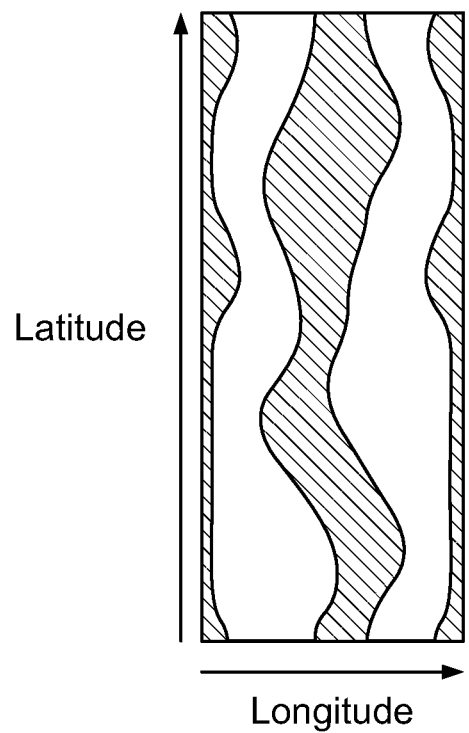
FIG. 4 is an example of a latitude-encoding graphic with a longitude coordinate varying horizontally and a latitude coordinate varying vertically.
Figure 5:
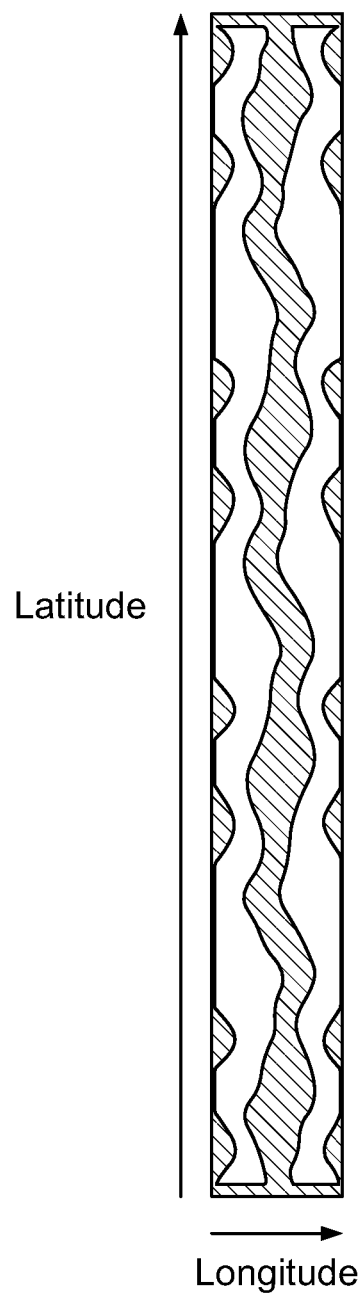
FIG. 5 is an example of an latitude-encoding graphic based on what is shown in FIG. 4 being repeated at consecutive latitude intervals and with particular latitude codewords modified by introducing dots.
Figure 6:
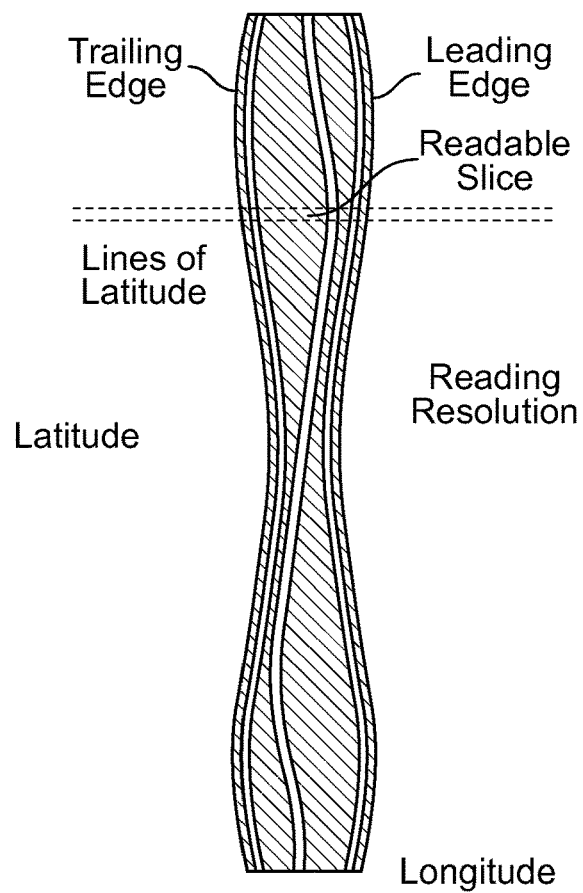
FIG. 6 depicts a relationship of some terms used herein.

The latitude-encoding graphic may take the form of the examples depicted in FIG. 4, FIG. 6, and within FIG. 3A as item 20, with latitude varying vertically and longitude varying horizontally. In FIGS. 4 and 6, the graphic is mapped to a Cartesian coordinate system on the plane, but in general can be mapped to any latitude-longitude coordinate system of a slidable surface, which may distort the rendered version of the graphic accordingly. FIG. 6 also embodies pictorial examples of the terms latitude, longitude, trailing edge, leading edge, readable slice, and reading resolution, and the relationship of these terms to one another and to a graphic of the kind shown in FIG. 5.

Further embodiments with different latitude-encoding graphics are accommodated within the definition of the term latitude-encoding graphic.

The latitude-encoding graphic, and the self-sliding surface to which the screen conforms, may be selected independently and combined to yield a variety of different embodiments of the scene point encoder, and therefore of the present invention.

In one embodiment the screen may be the surface of an optical diffuser sheet installed into a structure that holds it fixed in the appropriate shape (of a slidable surface), and onto which the latitude-encoding graphic is printed, and to which back lighting may be applied.

In an alternative embodiment the latitude-encoding graphic may be printed on a passive white sheet, held fixed in an appropriate shape (of a slidable surface) and illuminated by ambient or artificial external illumination.

For purposes of inspecting objects with surfaces that are more specular to infrared light than to visible light, the screen may be embodied, for example, by a metallic sheet shaped appropriately and potentially heated, with the graphic applied to it by means of an emissive substance such as black paint. This is also known as an emissivity-coded screen in [Höfer et. al 2016]

A latitude-encoding graphic can be repeated at successive intervals of latitude. The repetition naturally introduces ambiguity in the latitudinal coordinate from whence any particular signal of light emanated. To resolve these ambiguities, marker-assisted spatial phase-unwrapping algorithms can be used if certain assumptions can be made about the surface of the object under inspection. One way to introduce absolute markers for such algorithms would be to make modifications to particular latitude codes in the latitude-encoding graphic, for example by introducing dots. It should be noted, however, that this technique is in part just a repeated application of the concept essentially employing multiple graphics concurrently. Each slice of the latitude-encoding graphic, or in a defined set of slices should be unique, and distinguishable from all other slices, or from all other slices in the set (as the case may be). In this way data detected by a pixel can be uniquely associated with the scene point thereof i.e. the point of origin of the light which conveyed that data to the pixel.

FIG. 4 is a typical example of a latitude-encoding graphic wherein the latitude varies vertically and the longitudinal coordinate varies horizontally marked on the drawing. FIG. 5 shows multiple instances of the latitude-encoding graphic in FIG. 4, repeated at different latitudes but with particular latitude codes modified by introducing dots.

Figure 7A:
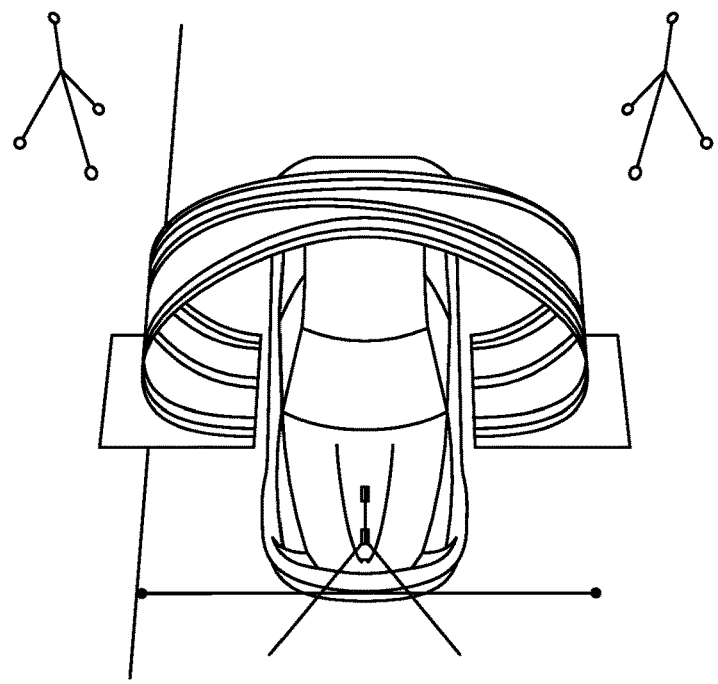
FIGS. 7A, 7B, and 7C are different schematic views of a self-sliding surface used to inspect the surface of an automobile using a latitude-encoding graphic.
Figure 7B:
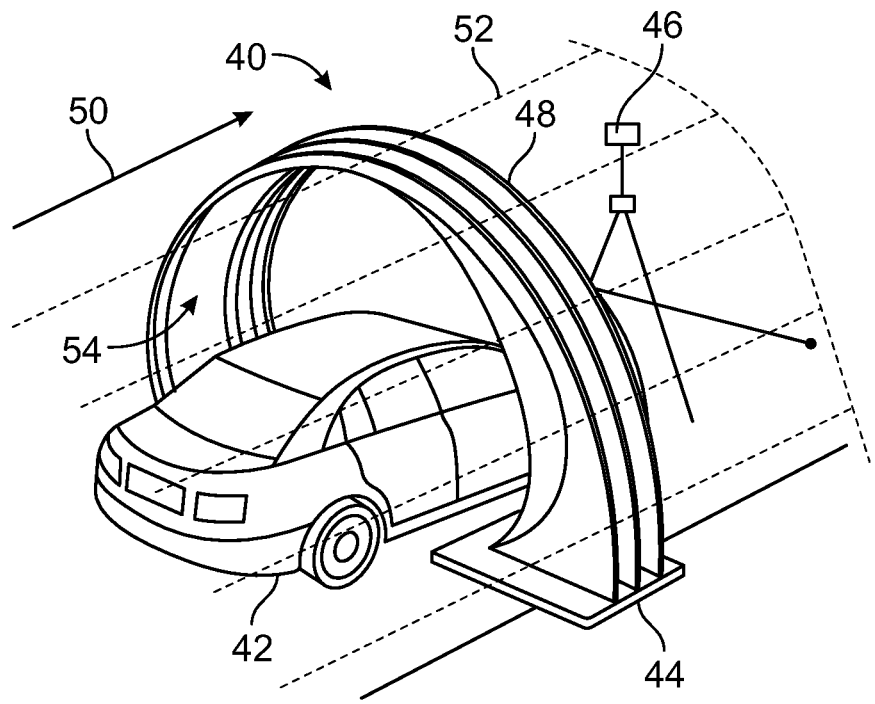
Figure 7C:
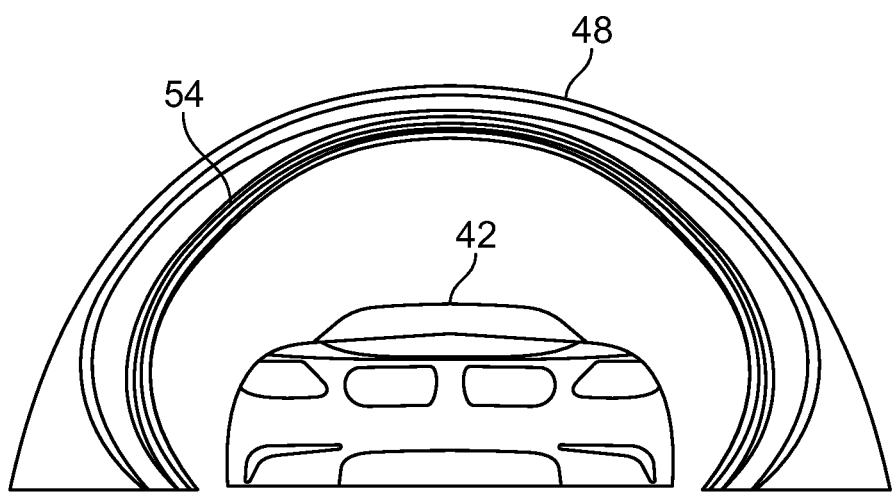

The inventive concept described herein can be used in a variety of applications and, typically, in the field of deflectometry and surface metrology. FIGS. 7A, 7B, and 7C illustrate in perspective from above and from one side and from one end respectively, and somewhat schematically, an apparatus 40 which is employed to inspect the specular surface of a vehicle 42. The vehicle is stationary on a platform 44. The surface of the vehicle is monitored by means of a plurality of cameras 46 which are at all times stationary and in fixed positions relative to the vehicle 42.

A carrier 48 is movable in a controlled manner, in a direction 50, relative to the vehicle 42. In this example the carrier 48 is in the form of an arch which extends from a surface of the platform 44 on one side of the vehicle to a surface of the platform on an opposing side of the vehicle.

The carrier 48 on an inner surface 54 carries a unique image of predetermined characteristics e.g. a latitude-encoding graphic of the kind shown in FIGS. 5 and 6. With the movement of the carrier, the graphic traverses a self-sliding surface 52 (shown in dotted lines). Due to the arcuate surface on which the graphic lies, a substantial fraction of the vehicle's surface can be mapped (to scene points in the encoded scene surface 52) from the perspective of cameras 46.

The graphic can be backlit using suitable light sources which are carried by the carrier or, if required, use can be made of ambient light. Irrespective of the illumination mechanism adopted each camera captures a succession of frames of views of the surface of the vehicle as the carrier is moved relative to the vehicle. The time at which each frame is captured by a camera is known and the position of the carrier and hence of the graphic at that time is also known. During the carrier's motion (in the direction 50) any given scene point (e.g. observed by a camera pixel via specular reflection) may be visited by all points of a given latitude codeword in the latitude-encoding graphic. To the extent that the latitude codeword has shift-invariant distance to all other latitude codewords in the graphic, it can be identified uniquely to ascertain the latitude of the observed scene point in the graphic.

By way of example only the speed of the moving graphic depends on the number of frames per second and is such that the distance moved by the graphic between successive frame captures of the camera may be between 0.2 mm (for inspecting small objects) and 20 mm (for inspecting larger objects).

The length of the graphic is dependent on the particular application and may vary from 100 mm to 10 meters. The width of the graphic is materially less than the length of the graphic typically about from 3% to 30% of the length of the graphic.

The width of a slice is ideally zero. Practically though it can be increased up to approximately the same value as the distance moved by the graphic between successive frame captures i.e. from 0.2 mm to 20 mm.

Typically at least twenty frames per second are captured. However the greater is the rate of frame capture the better is the resolution of the scene point encoder.

These numerical and comparative values, and other numerical and comparative values given in the specification, which have been established through design and test work to yield satisfactory results relate to inventive features of various embodiments of the invention.

FIG. 8 Illustrates in block diagram form some components of a scene point encoder 76 according to the invention.

pixel, for the succession of frames captured by the camera enables the identity (position) of the slice from which the light captured by that pixel originated, to be determined i.e. the latitudinal coordinate is known. Thus the coordinates of the scene point in the surface are determined.

The plurality of scene points, determined in this manner constitutes the light map of the surface of the object 92.

FIG. 9A similarly illustrates a planar screen 100 which can be parameterized by a Cartesian coordinate system. FIG. 9B shows a cylindrical screen 102 (which is also a slidable surface with linear sliding motions). FIG. 9C shows a screen 106, edges of which are tapered towards opposed polar extremities 108 and 110. This has the effect of requiring a graphic that is not rectangular in shape (when expressed in the Cartesian plane), but tapered towards the high and low latitudes. FIG. 9D shows a spherical screen 112 (which is a slidable surface with rotational sliding motions) which can be parametrized by a spherical coordinate system. When a graphic is applied to this screen, the mapping to the spherical coordinate system distorts the (rectangular) graphic by compressing the slices increasingly near the polar extremities 110 and 108. In all these FIGS. 9A, 9B, 9C, and 9D, the notional lines dividing the graphic into contiguous segments or slices run along lines of latitude, which are also parallel to the direction of motion.

References:

| Link | Citation (inconsistent format) | Relevance |
|---|---|---|
| Huang et al 2018 | Huang, Lei, Idir, Mourad, Zuo, Chao, and Asundi, Anand. Sat. "Review of phase measuring deflectometry". United States. doi: 10.1016/j.optlaseng.2018.03.026. https://www.osti.gov/servlets/purl/1438323. | Phase measuring deflectometry |
| Höfer et al 2016 | Höfer, Sebastian & Burke, Jan & Heizmann, Michael. (2016). Infrared deflectometry for the inspection of diffusely specular surfaces. Advanced Optical Technologies. 5. 10.1515/aot-2016-0051. | Infrared |
| Balzer et al 2014 | J. Balzer, D. Acevedo-Feliz, S. Soatto, S. Höfer, M. Hadwiger and J. Beyerer, "Cavlectometry: Towards Holistic Reconstruction of Large Mirror Objects," 2014 2nd International Conference on 3D Vision, Tokyo, 2014, pp. 448-455. doi: 10.1109/3DV.2014.85 | Multiple displays around object |
| Zang et al 2017 | Zhang, Z., Wang, Y., Huang, S., Liu, Y., Chang, C., Gao, F., & Jiang, X. (2017). Three-Dimensional Shape Measurements of Specular Objects Using Phase-Measuring Deflectometry. Sensors (Basel, Switzerland), 17(12), 2835. doi: 10.3390/s17122835 | IR, UV, phase measuring deflectometry |
| Rapp 2012 | Rapp, Holger H. (2012). Reconstruction of Specular Reflective Surfaces using Auto-Calibrating Deflectometry. KIT, Karlsruhe. DOI: 10.5445/IR/1000030538 | light map called "simple geometric mapping function" |

The encoder 76 includes a carrier 78 with a screen 78 which carries a latitude-encoding graphic 80. The screen 78 undergoes sliding motion (in this example is movable in a linear manner in a fixed direction and in a controlled manner) by means of a drive mechanism 84 using energy from a power source 86. At least one stationary camera 90 is in a fixed position relative to a stationary object 92, a surface of which is to be monitored, in the manner described hereinbefore. Movement of the screen 78 is synchronised (94) by means of a computing device 96 with the capturing by the camera 90 of a succession of frames of the object in such a way that the position of the graphic 80 (in the direction of movement) is ascertainable for each frame i.e. the longitudinal coordinate is determined. The data in each

ANNEX A

Definitions

In some of the definitions use is made of a number of terms which have specific meanings in mathematics. The terms continuous, tuple, curve (when used as a noun), vector space, pointwise, support, embedding, one-parameter group, surface of revolution, rigid motion, parametric surface, (generalized) cylindrical surface, continuous alphabet code, region, metric, functional, $L_1$ distance, $L_1(X,Y)$ distance, Euclidean norm, Euclidean distance, function [of] and self-evident variations of the aforegoing terms in other grammatical cases should be interpreted in the senses in which they are commonly understood in mathematics and geometry. The term [signal] conditioning should be interpreted in the sense in which it is commonly understood in the field of signal processing.

A camera means an instrument for recording or capturing a sequence of images, called frames, which are subsequently stored or transmitted digitally. The camera sensor typically includes a two-dimensional grid of sensing elements, called camera pixels, each of which transduces light incoming to the camera from a particular direction (or small neighborhood of directions represented by a particular nominal direction), to produce data, called the frame pixel, describing one or more characteristics, such as intensity, spectral components, or some other characteristic, of the light incident on that camera pixel.

A graphic is considered to be carried by a surface if it is rendered on the surface. This implies that the rendered graphic moves with the surface if the surface undergoes motion. More particularly for slidable surfaces, a graphic G: $\mathbb{R}^2 \to O$ is considered to be carried by a slidable surface S: $((u,v) \in R) \mapsto (P(u+s,v) \in \mathbb{R}^3)$ where u is longitude within the slidable surface and v is latitude within the slidable surface, if it is rendered on the slidable surface, which implies that the point $S(u,v)=P(u+s,v)$, whose position is dependent on the slide parameter s, emanates light described by $G(u,v)$.

A display means a controllable illuminant with a surface, divided into a two-dimensional grid of neighborhoods, called display pixels, each of which emanate light that can be modulated independently to display a sequence of images on the surface. A display may be embodied by a computer screen, a passive white screen with a video projector, or by some other means.

Figure 10A:
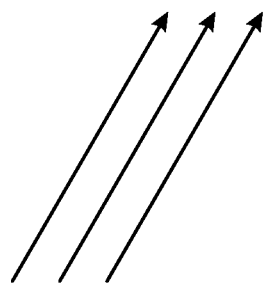
FIG. 10A illustrates light projected from three points.
Figure 10B:
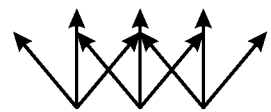
FIG. 10B illustrates light emanating from three points, and FIG. 11 graphically illustrates the optical distance between two optical values.

Light may be said to emanate from a point (or equivalently: the point can be said to emanate light) if the light diverges from that point in a variety of directions to illuminate an object under inspection. This may be accomplished by radiant emission (such as by points on a backlit display screen), by scattering reflection (such as by points on a passive screen responding to external illumination), or even by simple transmission (such as by a transparent material) from a relatively uniform background, or by other means. FIG. 10A illustrates light projected from three points, while FIG. 10B illustrates light emanating from three points.

An encoded scene surface means a region of a (potentially notional) reference surface, which region is traversed both by the leading edge and by the trailing edge of a slidable surface carrying a latitude-encoding graphic.

The encoded light map for a given camera observing a given object in a given scene means an association mapping camera pixels to signals that potentially correspond to scene points to which those camera pixels are responsive, which signals may potentially be decoded into the scene points by a predetermined algorithm.

A graphic means a mathematical function $G:R \subset \mathbb{R}^2 \to O$ of two coordinates, where O is some set of optical quantities, and $R \subset \mathbb{R}^2$ is a bounded region of $\mathbb{R}^2$. Equivalently a graphic may be represented by $G: \mathbb{R} \to O$ with support on a bounded region $R \subset \mathbb{R}^2$ outside of which the graphic's value is assigned to optical zero. A graphic G: $(R \subset \mathbb{R}^2) \to O$ is considered to be rendered on a parametrically described surface P: $\mathbb{R}^2 \to \mathbb{R}^3$ if each point $P(u,v)$ of the surface emanates light as described by the corresponding point in the graphic $G(u,v)$. Therefore, depending on the geometry of the slidable surface and the coordinate system by which it is parametrized, the graphic may appear on the surface in a stretched or distorted form, as is unavoidable if the surface is geometrically not a developable surface.

The inter-fold distance of a latitude-encoding graphic means the minimal shift-invariant distance between any two readable codewords that are spaced apart in latitude by at least $$\frac{\pi}{2\arctan 2N}$$

where N is the latitudinal code nonlinearity of the latitude-encoding graphic. More formally, the inter-fold distance is $$\min\left\{\min\left\{\int_\infty^\infty \left\|\frac{1}{d}\int_{v_1-\frac{1}{2}d}^{v_1+\frac{1}{2}d} G(u,w)dw - \frac{1}{d}\int_{v_2-\frac{1}{2}d}^{v_2+\frac{1}{2}d} G(u+s,w)dw\right\|_2 du \,\middle|\, s \in \mathbb{R}\right\} : |v_2 - v_1| \geq \frac{\pi}{2\arctan 2N}\right\}$$

where G: $\mathbb{R} \to O$ is the latitude-encoding graphic and d is the reading resolution.

latitude: see longitude and latitude.

A latitude-encoding graphic means a graphic $G:R \subset \mathbb{R}^2 \to O$ (intended to be rendered on a slidable surface) such that at each latitude v there appears a spatially-varying (along longitude u) optical signal $G_v: u \mapsto G(-u,v)$ called a latitude codeword. Ideally the encoding function $v \mapsto G_v$ mapping each latitude to its codeword is a continuous alphabet code and the latitude codewords form a topologically continuous one-dimensional metric space of optical signals. Practically, however, the latitude-encoding graphic may be notionally divided into a substantial but finite number of readable slices, the readable codewords of which are distinguishable from one another for practical purposes.

latitude codeword: see latitude-encoding graphic.

The latitudinal code gradient of a latitude-encoding graphic means the rate at which the readable codeword changes with respect to latitude. More particularly, the latitudinal code gradient at a given latitude v is the shift-invariant distance between the two adjacent readable codewords that are both bordered by the line of latitude v, divided by the reading resolution. More formally, the latitudinal gradient of a latitude-encoding graphic G: $\mathbb{R}^2 \to O$ at a given latitude v can be defined as $$\frac{1}{d}\min\left\{\int_{-\infty}^\infty \left\|\frac{1}{d}\int_{v-d}^v G(u,w)dw - \frac{1}{d}\int_v^{v+d} G(u+s,w)dw\right\|_2 du \,\middle|\, s \in \mathbb{R}\right\}$$

where d is the reading resolution.

The latitudinal code packing coefficient of a latitude-encoding graphic $G:R \subset \mathbb{R}^2 \to O$ means the median (over all latitudes) latitudinal code gradient divided by $$\frac{(\max\{u \mid (u,v) \in R\} - \min\{u \mid (u,v) \in R\})}{(\max\{v \mid (u,v) \in R\} - \min\{v \mid (u,v) \in R\})} O_{max}.$$

This definition is designed such that the latitudinal code packing coefficient is equal to 1.0 for a latitude-encoding graphic comprising only a triangle (as illustrated in FIGS. 3A to 3C. More efficient codes achieve higher latitudinal code packing coefficients.

The latitudinal code nonlinearity of a latitude-encoding graphic at a particular latitude v is the $L_1(\mathbb{R},O)$ distance between a readable codeword and the average of its neighbors, divided by the $L_1(\mathbb{R},O)$ distance between the neighbors. More formally, the latitudinal code nonlinearity of a latitude-encoding graphic G: $\mathbb{R}^2 \to O$ at latitude v is $$\frac{\left\| G'_v - \frac{1}{2}(G'_{v-d} + G'_{v+d}) \right\|_{L_1}}{\|G'_{v-d} - G'_{v+d}\|_{L_1}},$$

where $G'_v$ denotes the readable codeword centered at latitude v. If a readable codeword is equal to the average of its neighbors, the latitudinal code nonlinearity is zero at that latitude. The leading edge of a slidable surface means the curve consisting of, for each latitude occurring in the surface, the point of maximal longitude at that latitude. More formally, the leading edge is $\{S(u,v) | (\nexists (u',v') \in R) [v=v' \wedge u'>u])\}$ if the slidable surface is described parametrically by S: $((u,v) \in R) \mapsto (P(u+s,v) \in \mathbb{R}^3)$.

The term light map for a given camera observing a given object in a given scene means an association mapping (some) camera pixels to the scene points to which those camera pixels are responsive (potentially via specular reflection on the surface of the object). Each camera pixel is either mapped to a scene point, in which case it is said to be a mapped pixel, or is an unmapped pixel and associated with no scene point. (Since pixels typically have non-zero extent, each camera pixel is typically responsive to a neighborhood of scene points. The neighborhood corresponding to a given mapped pixel is represented in the light map by a single scene point that is near to all scene points in the neighborhood.)

The noun light means electromagnetic radiation of wavelengths shorter than 1 millimeter. This would include, for examples, infrared, visible light, ultraviolet, etc.

A line of latitude means a line or curve, all points of which have the same latitude.

A line of longitude means a line or curve, all points of which have the same longitude.

The terms longitude and latitude, when used in reference to a self-sliding surface (or some region thereof), shall be understood as referring to two coordinates that jointly identify any point of the self-sliding surface, defined such that if the surface undergoes a sliding motion along with every point within it, every point remains at its original latitude (in reference to the original unslid surface) while every point undergoes the same change in longitude (in reference to the original unslid surface), which shall be referred to as the slide parameter (of the sliding motion). (This is akin to the motion and coordinate system of the Earth's surface as the Earth revolves about its own axis.) The slide parameter may represent a linear displacement, an angle of rotation, or a combination thereof. A self-sliding surface with this coordinate system can be described parametrically by $(u,v) \mapsto (P(u+s,v) \in \mathbb{R}^3)$ for some P: $\mathbb{R}^2 \to \mathbb{R}^3$, where s is the slide parameter, and u and v are longitude and latitude respectively.

When longitude and latitude are used in renference to a graphic, they mean the first and second (respectively) coordinates that jointly identify any point in the graphic. See also the defined meaning of rendering a graphic on a slidable surface.

mapped pixel: see light map.

Figure 11:
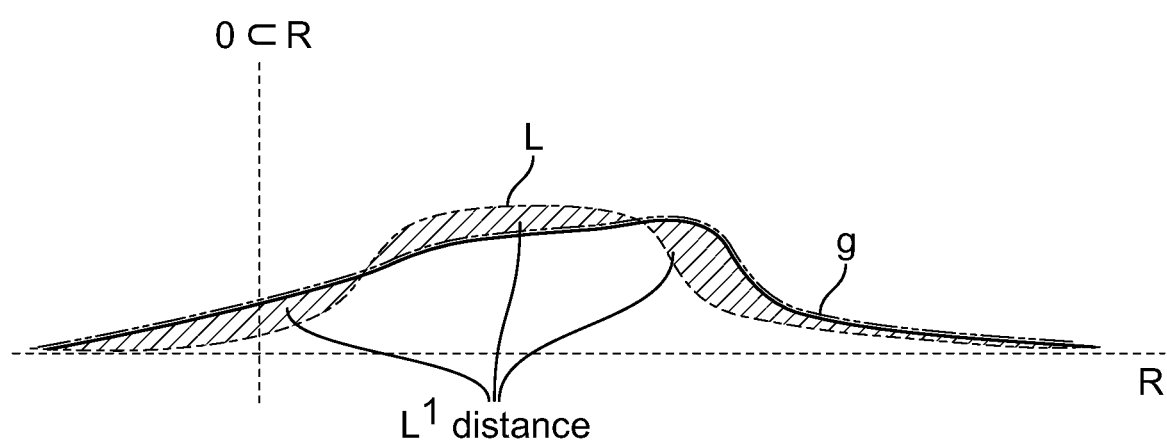

The optical distance between two optical values $O_1$ and $O_2$ (which may be scalar or vector) means the Euclidean norm of the difference between those two optical values $\|O_1 - O_2\|_2$. The optical distance between two optical signals f: $\mathbb{R} \to O$ and g: $\mathbb{R} \to O$ means the integral of the pointwise optical distance between corresponding values in those signals, $\int_{-\infty}^{\infty} \|f(u)-g(u)\|_2 du$, which is also known mathematically as the $L^1(\mathbb{R}, O)$ norm of the pointwise difference between the signals. If O is a bounded region of $\mathbb{R}$ (e.g. grayscale value varying between black and a predetermined white) then the optical distance between f: $\mathbb{R} \to O$ and g: $\mathbb{R} \to O$ can be visualized as the area enclosed between their plots, as illustrated in FIG. 11.

The optical maximum $O_{max}$ of a graphic G:$R \subset \mathbb{R}^2 \to O$ means max $\{\|G(u,v)\|_2 | (u,v) \in \mathbb{R}^2\}$, which is, of all optical values appearing in the graphic, the optical value that is most optically distant from optical zero. For a graphic of visible light, black typically corresponds to optical zero and white typically corresponds to optical maximum.

An optical signal means a signal whose codomain consists of optical quantities. An optical signal may, for example, describe light varying temporally or spatially.

An optical quantity means a quantitative description of the nature of local light (e.g. emanating from some local point or neighborhood, or entering a camera pixel). An optical quantity describing, for example, grayscale luminous intensity would be a scalar, whereas an optical quantity describing multiple spectral components (such as, for example, the intensities of red, green, and blue light) would be a tuple vector. In general an optical quantity may describe any aspect of light that can be quantified by a camera pixel in principle.

The term optical zero means an optical quantity value serving as a background or default quantity in the absence of modulation. For example, the absence of light (i.e. darkness) would typically be considered optical zero, if the background in the absence of modulation is dark. Alternatively some other substantially uniform background can in principle influence the meaning of optical zero. Optical zero is represented numerically as O.

A readable codeword of a latitude-encoding graphic means a (spatial) signal over longitude that is the latitude-averaged readable slice of a latitude-encoding graphic. More particularly, for a readable slice of a latitude-encoding graphic G: $\mathbb{R}^2 \to O$ between latitudes $v-\frac{1}{2}d$ and $v+\frac{1}{2}d$ (where d is the reading resolution) the readable codeword is $$G'_v : (u \in \mathbb{R}) \mapsto \frac{1}{d} \int_{v-\frac{1}{2}d}^{v+\frac{1}{2}d} G(u, v) dv.$$

A readable slice (of a graphic) means a region (contiguous segment) of a rendered graphic between two lines of latitude separated (wherever they are most distant from each other) by a distance equal to the reading resolution.

The reading resolution of a given camera positioned in relation to an object and a scene surface, means a predetermined dimension approximating the minimum size of the region of scene points to which a single camera pixel is responsive, via specular reflection on a flat surface of the object under inspection. More particularly, for a camera with $N_h$ pixels across a width dimension corresponding to the camera's lateral angle of view of $\alpha_h$, and where the camera is separated from the object under inspection by a distance of $d_c$ and where the scene surface is at its closest point a distance $d_s$ from the object, the reading resolution is given by $$\frac{2(d_c + d_s)}{N_h} \tan \frac{\alpha_h}{2}.$$

The reference surface of a slidable surface means the self-sliding surface of which the slidable surface is a region, along with its coordinate system, fixed in position such that the slide parameter remains zero. The reference surface with its coordinate system can be described parametrically by $(U,V) \mapsto (P(U,V) \in \mathbb{R}^3)$ if the self-sliding surface is described by $(u,v) \mapsto (P(u+s,v) \in \mathbb{R}^3)$ where s is the slide parameter.

render: see graphic.

A camera pixel may be said to be responsive to a scene point if there exists an optical path connecting that scene point to the camera pixel, either directly or via specular reflection, along which light emanating from the scene point can stimulate the camera pixel.

The scanning resolutionmeans the a predetermined distance approximating the maximum distance by which any point of a screen carrying a graphic moves between two consecutive frame captures by the camera, as determined by a predetermined speed at which the screen moves and by a predetermined rate at which the camera captures frames.

The scene means the surroundings of an object under inspection. Typically a reflected (and possibly distorted) image of some part of the scene is visible as a reflection in the specular surface of the object under inspection, if the surface is specular to visible light.

A scene point means a point of the scene surface, with latitude and longitude determined in reference to the (stationary) scene surface.

The term scene point encoding means modulation of light (over time or over some time-dependent variable) emanating from scene points such that the modulated light emanating from each scene point carries information about the location of that scene point.

The term scene point decoding means an attempt (e.g. by a computer) to recover the location of a scene point from observation of the light emanating from it, as modulated by scene point encoding.

A scene surface means a (physical or notional) surface consisting of points in the scene, each of which can potentially emanate light. The scene surface is stationary relative to (i.e. held in fixed relationship with) the object under inspection.

Figure 1:
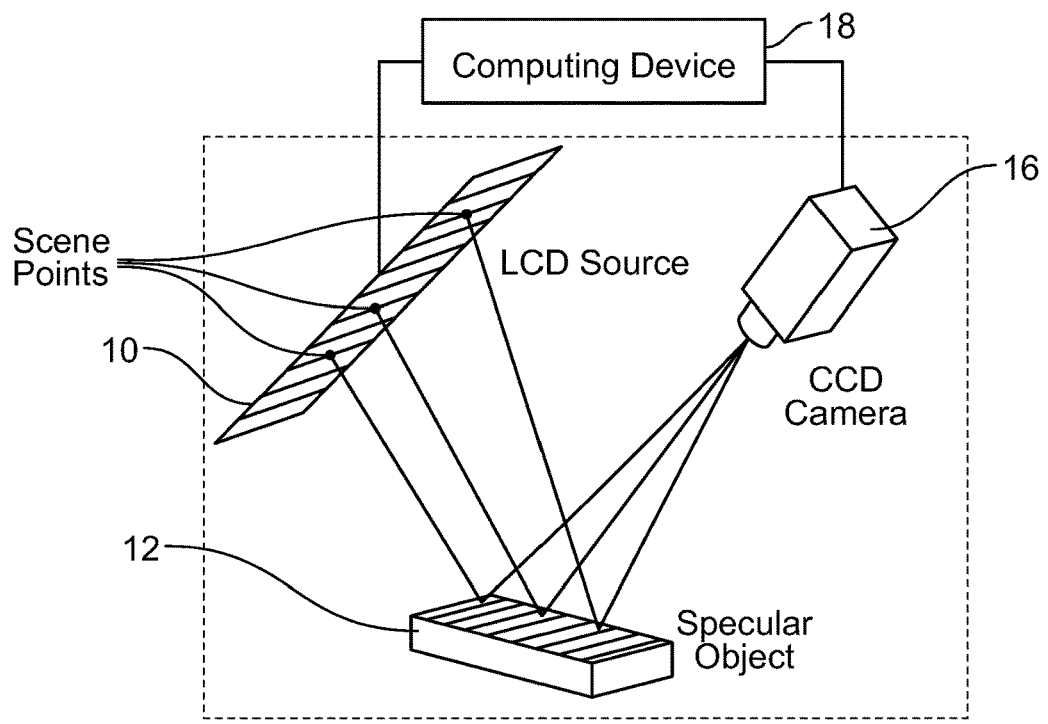
FIG. 1 is a diagrammatic illustration of a prior art approach to producing a light map.
Figure 2A:
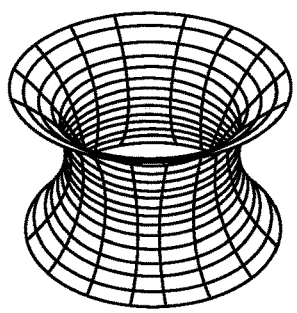
FIGS. 2A, 2B, 2C, and 2D depict surfaces of revolution, also referred to as slidable surfaces.
Figure 2B:
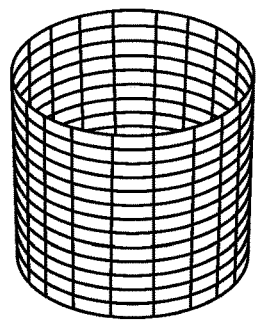
Figure 2C:
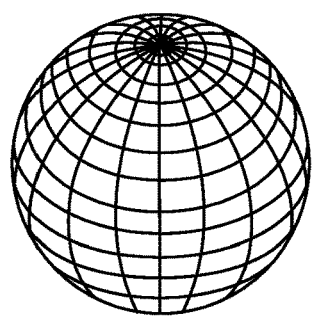
Figure 2D:
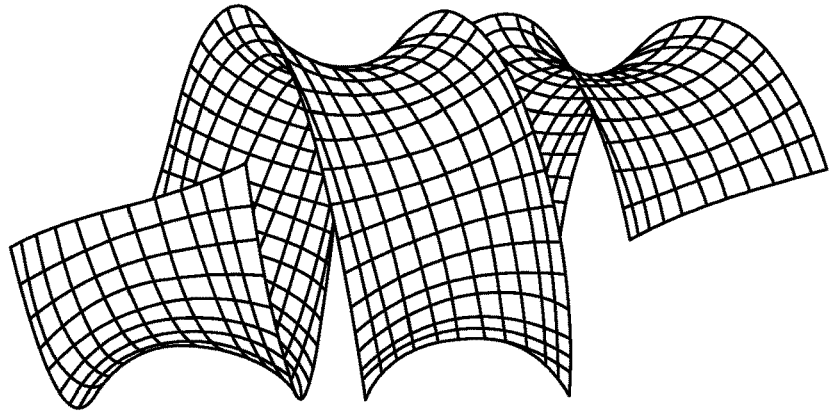

A self-sliding surface means a smooth surface $S \subset \mathbb{R}^3$ that is invariant under some continuous one-parameter group of transformations, which shall be referred to as sliding motions. If the sliding motions are rigid motions (as would be required if the surface is rigid), then the self-sliding surface may be any of the following examples:

a plane (permitting as sliding motions: rotations about an axis perpendicular to the plane, or translations parallel to the plane, or an arbitrary predetermined combination of such rotation and translation)

a surface of revolution (permitting as sliding motions: rotations about the axis of the surface of revolution) e.g. FIG. 2A a generalized cylindrical surface (permitting as sliding motions: translations along the cylinder's axis) e.g. FIG. 2B a generalized helicoid (permitting as sliding motions: a particular proportional combination of rotation about the helicoid's axis and translation along the helicoid's axis) e.g. FIG. 2C a circular cylinder (permitting as sliding motions: rotations about the cylinder's axis, or translations along the cylinder's axis, or an arbitrary predetermined combination of such rotation and translation) e.g. FIG. 2D.

Non-rigid surfaces (such as may be embodied as the physical surface of a flexible material conveying between rollers) may also comply with the definition of a self-sliding surface.

A screen means a surface on which a predetermined graphic can be rendered. If the screen moves the predetermined graphic is carried along with the screen.

To shift a signal $x \mapsto f(x)$ by $\Delta$, or apply a shift $\Delta$ to the signal, means transforming the signal into $x \mapsto f(x-\Delta)$.

The shift-invariant distance between two optical signals f: $\mathbb{R} \to O$ and g: $\mathbb{R} \to O$ means the optical distance between them, minimized over all relative shifts between the signals. Or more formally: $\min\{\int_{-\infty}^{\infty} \|f(u)-g(u+s)\|_2 du | s \in \mathbb{R}\}$. Informally, the shift-invariant distance between two optical signals is the signal distance between them after aligning them to each other. The shift-invariant distance is deliberately defined such that its value does not change when one of the signals under considerations is shifted relative to the other.

A signal means a mathematical function of one scalar variable, such as scan state (temporally varying), or longitude (spatially varying).

A slidable surface means a bounded region of a self-sliding surface. When a slidable surface undergoes sliding motion, it remains confined to the self-sliding surface of which it is a region. And if it undergoes substantially sliding motion, it remains substantially confined to the surface of which it is a region.

A sliding motion: see self-sliding surface.

A specular surface means a glossy surface of a physical body on which (at the scale of neighborhoods observed by individual camera pixels, and at the wavelengths of light observed by the relevant camera) at least a non-negligible fraction of incoming light undergoes specular reflection rather than diffuse reflection.

A surface means a surface in the geometric (mathematical) sense of the word, in physical space without necessarily involving any physical body unless it is a surface of a body. A Surface is a generalization of a plane or subplane that needs not be flat, meaning that the curvature is not necessarily zero. This is analogous to a curve generalizing a straight line or curve segment generalizing a line segment.

The trailing edge of a slidable surface means the curve consisting of, for each latitude occurring in the surface, the point of minimal longitude at that latitude. More formally, the trailing edge is $\{S(u,v) | (\nexists (u',v') \in R)[v=v' \wedge u'<u])\}$ if the slidable surface is described parametrically by S: $((u,v) \in R) \mapsto (P(u+s,v) \in \mathbb{R}^3)$.

unmapped pixel: see light map.

The invention claimed is:

1. An apparatus to facilitate generation of a light map sensitive to a partially or totally specular surface of an object under inspection, the apparatus including:

(a) a screen conforming substantially to a self-sliding surface that is movable relative to the object by sliding motion parametrized by a slide parameter which identifies a position of the screen within its set of positions traversable by the sliding motion, wherein the screen has a latitude and longitude coordinate system such that the sliding motion is longitudinal, wherein the screen has a leading edge and a trailing edge which are spaced from one another across a longitudinal dimension of the screen and the sliding motion is such that the trailing edge follows the leading edge on a stationary notional surface between respective start and end positions of the screen, wherein the stationary notional surface that is traversed both by the screen's leading edge and by the screen's trailing edge during the sliding motion of the screen is an encoded scene surface;

(b) a latitude-encoding graphic carried by the screen in accordance with its intrinsic latitude and longitude coordinate system, wherein the latitude-encoding graphic consists of latitudinally-varying longitudinal slices, which are latitude codewords; and (c) at least one camera, held in a fixed spatial relationship relative to the object, for capturing successive frames of the object during said relative sliding motion of the screen, wherein at least a part of the surface of the object that is under inspection reflects light emanating from or passing through the encoded scene surface into the camera, and (d) a computing device that accepts data of the captured frames for storage or processing, wherein light emanating from any scene point in the encoded scene surface, as a function of the slide parameter, is describable by the scene point's latitude's codeword shifted according to the scene point's longitudinal position in the encoded scene surface.

2. An apparatus according to claim 1 wherein the graphic illuminates the object during the sliding motion.

3. An apparatus according to claim 1 wherein each captured frame is associated with the slide parameter's value at the time that the frame was captured.

4. An apparatus according to claim 1 wherein the screen is movable relative to the object with one degree of freedom.

5. An apparatus according to claim 1 wherein if the screen is described parametrically by $(((u,v) \in R \rightarrow P(u+s,v) \in \mathbb{R}^3)$ where u is longitude on the screen, v is latitude on the screen, s is the scan state, and R is a bounded two-dimensional region on the screen over which the latitude-encoding graphic is defined, and $P(u+s,v) \in \mathbb{R}^3$ is the physical location in three-dimensional coordinate space $\mathbb{R}_3$ of the point having screen longitude u and screen latitude v, and if the latitude-encoding graphic is $(u,v) \rightarrow G(u,v)$, then the light emanating from any moving point $P(u+s,v)$ is described by $G(u,v)$.

6. An apparatus according to claim 1 wherein the latitude-encoding graphic is selected to comply with at least one of the following:

(i) such that each respective latitude corresponds to a unique readable codeword, or such that readable codewords at consequentially different latitudes are recognizably different from one another;

(ii) such that readable codewords at consequentially different latitudes are separated by a sufficient shift-invariant distance to discriminate between them in the presence of noise or distortion;

(iii) such that its latitude codewords comprise high frequency components, so as to facilitate discrimination of specular reflection from diffuse reflection consisting predominantly of low-frequency components in the combined optical signal; and (iv) such that the pointwise average of neighbouring readable codewords is similar to the readable codeword corresponding to the average of those neighbouring readable codewords' latitude.

7. An apparatus according to claim 1 wherein to facilitate prospective identification of longitudes of scene points from which observed signals emanated the latitude-encoding graphic is selected such that readable codewords each have sufficiently concentrated auto-correlation functions.

8. An apparatus according to claim 1 wherein at least one of:

(i) the screen is embodied by a metallic sheet shaped appropriately and potentially heated, with the graphic applied to it by means of a thermally emissive substance; and (ii) the metallic sheet is cut away in regions to contrast with a background.

9. An apparatus according to claim 1 wherein at least one of:

(i) multiple latitude-encoding graphics are rendered on the screen to occupy consecutive intervals of latitude; and (ii) the graphic is elongate with a length which is greater at least, by an order of magnitude, than its width.

10. An apparatus according to claim 1 wherein at least one of:

(i) the object is located on a platform and the screen is in the form of an arch which extends from a surface of the platform on one side of the object to a surface on the platform on an opposing side of the object; and (ii) the distance moved by the graphic between successive frame captures is between 0.2 mm and 20 mm, the length of the graphic is from 100 mm to 10 meters, the width of the graphic is from 3% to 30% of the length of the graphic and the width of a slice is the same value as the distance moved by the graphic between successive frame captures.

11. An apparatus according to claim 10, wherein at least one of:

(i) the latitude codewords form a continuous one-dimensional metric space of optical signals; and (ii) the latitude codewords are non-repeating over an interval of at least twenty consecutive uniquely recognizable latitude codewords.

12. An apparatus according to claim 1 wherein at least one of:

(i) the latitude-encoding graphic's latitudinal code packing coefficient is greater than 1.5; and (ii) the latitude-encoding graphic's latitudinal code non-linearity is less than 0.2 at all latitudes.

13. An apparatus according to claim 1, wherein a function mapping each latitude to its corresponding latitude codeword in the latitude-encoding graphic is a continuous alphabet code.

14. An apparatus according to claim 1, wherein at least one of:

(i) the screen is arcuate along only one dimension;

(ii) the screen is arcuate along a dimension substantially perpendicular to the direction of screen's motion;

(iii) the screen is curved in two perpendicular dimensions;

(iv) the screen substantially conforms to a surface of revolution; and (v) the screen substantially conforms to a generalized helicoid.

15. A method according to claim 14 wherein at least one of:
   (i) the frames are captured at a rate which is dependent on the speed of movement of the graphic;
   (ii) the graphic is a latitude-encoding graphic;
   (iii) the reference surface is a self-sliding surface along which the latitude-encoding graphic's motion is constrained in latitude; and
   (iv) the graphic comprises a plurality of segments divided from one another by notional lines that extend in the direction in which the screen is locally movable, and is such that the graphic content in any segment allows that segment to be distinguished from a plurality of neighbouring segments.

16. An apparatus according to claim 1, wherein the distance by which the screen is movable is at least five times greater than its own extent in the direction of motion.

17. An apparatus according to claim 1, wherein each latitude codeword has spectral bandwidth along longitude at least comparable to the spectral bandwidth of a high-contrast transition in colour or optical intensity.

18. An apparatus according to claim 1, wherein at least one of:
   (i) the latitude-encoding graphic contains at least one high-contrast edge extending across latitudes; and
   (ii) the latitude-encoding graphic comprises longitudinally adjacent contrasting regions of internally uniform intensity.

19. An apparatus according to claim 1, wherein at least one of:
   (i) the latitude codewords are unique within predetermined intervals of latitude; and
   (ii) the readable latitude codewords are non-repeating for at least twenty consecutive uniquely distinguishable latitude codewords.

20. A method of generating data relating to a partially or totally specular surface of an object, the method including the steps of:
   (a) providing a graphic of predetermined characteristics in relation to an intrinsic latitude and longitude coordinate system, wherein the graphic is a latitude-encoding graphic consisting notionally of latitudinally-varying longitudinal slices which are latitude codewords, wherein the graphic is carried longitudinally by a screen movable with sliding motion parameterized by a slide parameter which identifies the screen's position within its set of positions traversable by the sliding motion,
   (b) positioning at least one camera at a fixed position relative to the object whereby the camera can view the object,
   (c) causing the graphic carried by the screen, having a leading edge and a trailing edge which are spaced from one another across a width dimension of the screen corresponding to a longitudinal dimension of the graphic, to move relative to the object along a notional reference surface that is stationary relative to the object, wherein that part of the notional reference surface that is traversed both by the screen's leading edge and by the screen's trailing edge during movement of the screen is an encoded scene surface with a corresponding latitude and longitude coordinate system identifying scene points within it, wherein some part of the object's surface specularly reflects into the camera light emanating from or passing through the encoded scene surface,
   (d) causing the camera to capture a plurality of frames of the object, which is illuminated by the graphic, each frame including a plurality of pixels, wherein each frame is associated with a respective position of the graphic in the reference surface, and
   (e) relating each pixel which recorded light to a scene point in the reference surface from which that light emanated, wherein light emanating from any scene point in the encoded scene surface, as a function of the slide parameter, is describable by the scene point's latitude's codeword shifted by the scene point's longitude.

* * * * *